United States Patent [19]
Habedank

[11] Patent Number: 6,030,043
[45] Date of Patent: Feb. 29, 2000

[54] MOTOR VEHICLE SEAT, IN PARTICULAR BACK SEAT

[75] Inventor: Klaus-Dieter Habedank, Stadthagen, Germany

[73] Assignee: Bertrand Faure Sitztechnik GmbH & Co. KG, Stadthagen, Germany

[21] Appl. No.: 09/213,633

[22] Filed: Dec. 18, 1998

[30] Foreign Application Priority Data

Dec. 18, 1997 [DE] Germany ............................ 197 56 491
Jun. 25, 1998 [DE] Germany ............................ 198 28 217

[51] Int. Cl.[7] ...................................................... B60N 2/22
[52] U.S. Cl. ...................... 297/342; 297/320; 297/362.14
[58] Field of Search .................... 297/317, 320, 297/321, 322, 330, 342, 362.12, 362.14, 362.11

[56] References Cited

U.S. PATENT DOCUMENTS

| | | | |
|---|---|---|---|
| 4,505,514 | 3/1985 | Stöckel et al. | 297/322 |
| 4,616,874 | 10/1986 | Pietsch et al. | 297/330 X |
| 5,203,608 | 4/1993 | Tame | 297/320 |
| 5,269,588 | 12/1993 | Kunz et al. | 297/322 |
| 5,884,970 | 3/1999 | Howard | 297/330 X |

*Primary Examiner*—Peter R. Brown
*Attorney, Agent, or Firm*—White & Case LLP

[57] ABSTRACT

A motor vehicle seat includes a base, a seat portion having a forward end coupled to the base at a longitudinally adjustable pivot location, and a back rest. A tilt adjustment device has a first hinge portion secured relative to the back rest, and a second hinge portion whose angular position is adjustable relative to the first hinge portion. An articulation lever extends from the second hinge portion and is pivotably secured to the seat portion. The distal end of the articulation lever is pivotably coupled to the base at a longitudinally adjustable pivot location. In this manner, the tilt position of said back rest may be adjusted by changing the angle of the articulation lever relative to the seat portion pivot, and may be further adjusted independent of the articulation lever by actuating the tilt adjustment device. Preferably, the seat is axially adjustable relative to the base, and a coupling mechanism, such as a spindle/spindle nut assembly, moves the seat and articulation lever distal end at unequal rates, so that, as the seat moves backward and forward, the tilt angle of the back rest automatically changes.

11 Claims, 12 Drawing Sheets

MOTOR VEHICLE SEAT, IN PARTICULAR BACK SEAT

BACKGROUND OF THE INVENTION

The present invention relates to motor vehicle seats with a seat portion and a back rest whose upright position can be adjusted using a tilt adjustment device. This invention has particular application in connection with the back seats of automobiles, but may be used with other motor vehicle seats if desired.

U.K. patent application No. 2,300,352 discloses a motor vehicle seat in which the back rest pivots around a horizontal pivot axis at the bottom end of the back rest. The angle of pivot is determined by a clutch device that makes it possible to lock the back rest in two different positions relative to the automobile car body. It is not possible to adjust the back rest at other positions.

An adjustment device in which the angle of the back rest can be continuously adjusted, relative to the seat portion, is disclosed in U.S. Pat. No. 4,668,013. Two hinge portions, one of which is attached to the seat portion and the other of which is attached to the back rest, are connected through a planetary gear train. More particularly, one hinge portion has a pair of coaxial sun gears, i.e., gears with internally facing gear teeth, of differing diameters. The other hinge portion has a corresponding pair of planet gears, i.e., gears with externally facing gear teeth. Each planet gear has a slightly smaller outer diameter, and one less gear tooth, than the corresponding sun gear. The planet gears are eccentrically mounted relative to the sun gears on a common crank, so that the upon rotation of the crank, the planet gears move in an orbital path relative to the sun gears. An adjustment knob is provided for rotating the crank. Due to the fact that each planet gear has one less gear tooth than the corresponding sun gear, the orbital motion of the planet gears, caused by rotating the knob, causes a small amount of rotation between the two hinge portions, thereby changing the tilt angle of the back rest.

SUMMARY OF THE INVENTION

A motor vehicle seat includes a base, a seat portion having a forward end coupled to the base and a back rest. A tilt adjustment device has a first hinge portion secured to the back rest, and a second hinge portion whose angular position is adjustable relative to the first hinge portion. An articulation lever extends from the second hinge portion and is secured to the seat portion about a pivot shaft located in the back end of the seat portion. The distal end of the articulation lever is pivotably coupled to the base at a longitudinally adjustable pivot location. In this manner, the tilt position of the back rest may be adjusted by moving the lower end of the articulation lever relative to the seat portion pivot, and may be further adjusted independent of the articulation lever by actuating the tilt adjustment device.

Preferably, a strut is pivotably connected between the seat portion, at the location where it is coupled to the base, and the seat portion pivot.

Preferably, the seat is axially adjustable relative to the base. A first guide element, coupled to the forward end of the seat portion, is guided for axially movement along the base. A second guide element, coupled to the lower end of the articulation lever, is also guided for axial movement along the base. A drive mechanism selectively moves the guide elements in a longitudinal direction, thereby changing the longitudinal position of the seat. In an exemplary embodiment, the guide elements are spindle nuts, and the drive mechanism includes a motor-driven spindle.

Preferably, the spindle includes regions of different thread pitch engaging the respective spindle nuts, so that rotation of the spindle moves the seat portion and articulation lever distal end at unequal rates. In this manner, as the seat moves forward and back, the tilt angle of the back rest automatically changes. Preferably, the articulation lever moves faster than the seat portion so that, when the seat is moved forward, the back rest automatically reclines.

In another embodiment, the seat further comprises a height adjustment device for pivotably coupling the forward end of the seat portion to the base. Preferably, the height adjustment device and tilt adjustment device include a rotatable adjustment knob as in known types of adjustment devices.

For a better understanding of the invention, reference is made to the following detailed description of a preferred embodiment, taken in conjunction with the drawings accompanying the application.

DETAILED DESCRIPTION OF PREFERRED EMBODIMENTS

In the drawings, the same or corresponding parts are labeled with the same reference symbols. The second embodiment in accordance with FIGS. 5 through 1 differs from the first embodiment only in that the second embodiment has a height adjustment device for raising the forward end of the seat portion.

Figure 1:
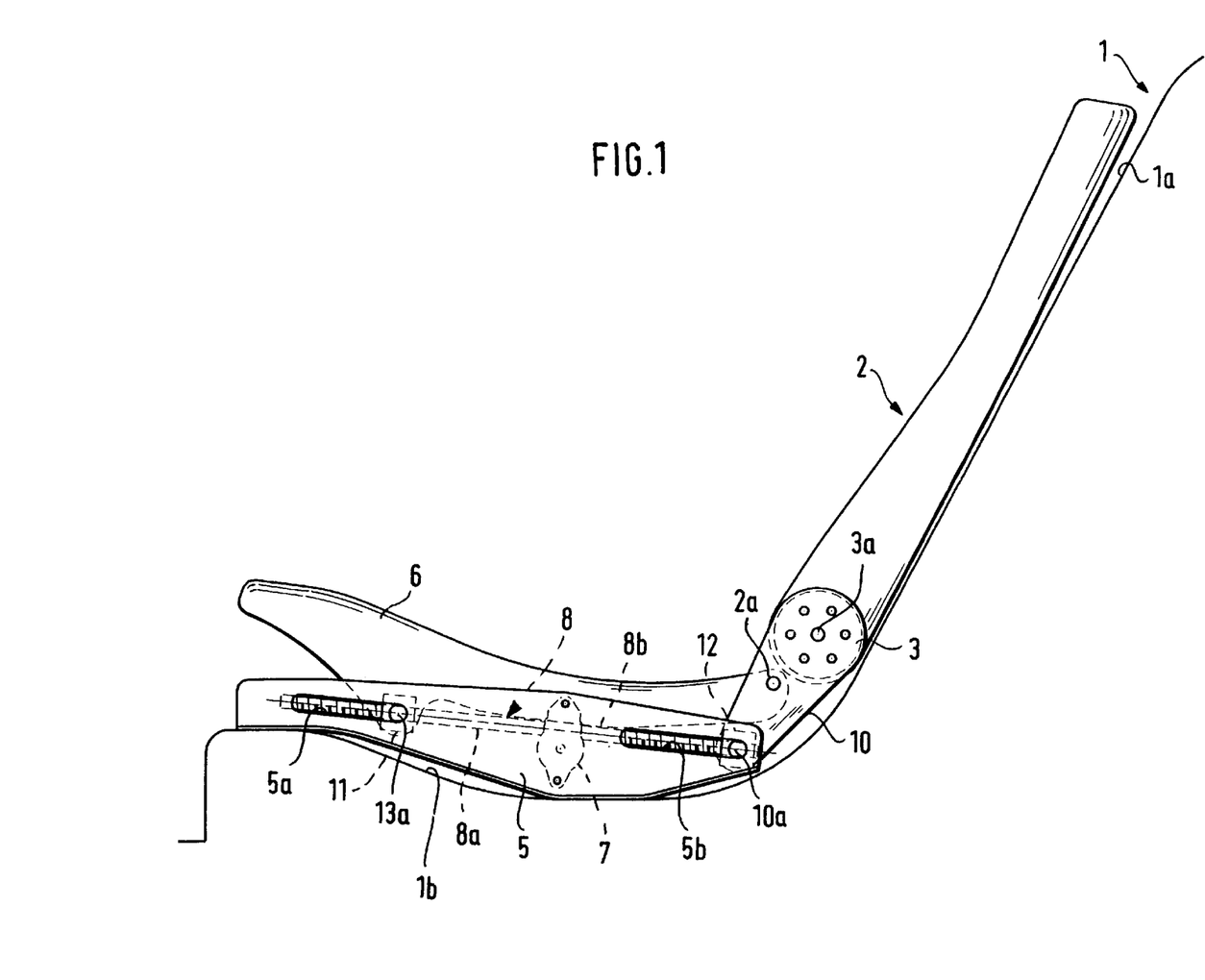
FIG. 1 is a schematic side view of a first embodiment of an automobile seat, in its rearmost position with the back rest tilted rearwardly.

FIG. 1 shows in schematic form an automobile car body 1 having a rear panel 1a and a floor 1b forming part of a passenger compartment. A base 5 is attached to the floor 1b and supports An automobile seat includes a base 5 attached to the floor 1b, on which a seat portion 6 and a back rest 2 are supported.

The tilt angle of the back rest 2 is adjustable by means of a tilt adjustment device 3, which includes a pair of hinge parts which are mutually rotatable about a pivot shaft 3a, on which an adjustment knob, which is omitted for clarity, is mounted. Adjustment devices 3 for pivoting a back rest 2 are well known, for example as disclosed in U.S. Pat. No. 4,668,013, the disclosure of which is incorporated herein by reference. As described above, pivot shaft 3 is a crank, on which one or more planet gears are eccentrically mounted relative to one or more sun gears, so that rotation of shaft 3, which occurs upon rotation of the adjustment knob, causes a small amount of rotation between the planet and sun gears, thereby changing the angle between the hinge parts. A planetary gear train is shown schematically in FIG. 1 and, because such mechanisms are known and have been commercially utilized in automobiles, it need not be described further here. Moreover, while the figures depict a planetary gear train, the type of adjustment device 3 used is not important and any suitable mechanism may be used.

One hinge part 3b of the adjustment device 3 is permanently attached to the back rest, preferably by being secured to part of the back rest frame. The other hinge part of the adjustment device 3 is permanently attached to an articulated lever 10. In referring to the other hinge part being permanently attached to the lever 10, the hinge part may be a separate piece attached to the lever 10 or, if desired the lever 10 can be formed directly as a hinge part for adjustment device 3, e.g., such that the upper end of lever 10 is provided with a planetary gear or a sun gear to engage the corresponding gear on hinge part 3b.

The articulated lever 10 receives a horizontal pivot shaft 2a secured to the seat portion 6 at a rear location thereof, thereby connecting the back rest 2 to the seat portion 6. The distal end of the articulated lever 10 is pivotable about a pivot 10a, which is received in a guide slot 5b formed in the base 5 such that the pivot 10a can move in a longitudinal direction within guide slot 5b. The pivot 10a is also secured in a spindle nut 12.

The spindle nut 12 is mounted in the base 5 in a non-rotatable but longitudinally displaceable manner. A spindle nut 11 is likewise supported in the forward end of the base 5 in a longitudinally moveable, but non-rotatable manner. A pivot 13 is secured to the spindle nut 11 and received within guide slot 5a in the base 5. An axially oriented spindle 8 includes threaded spindle regions 8a and 8b, which regions can have threads of different pitch. The spindle nut 11 receives the threaded spindle region 8a, and the spindle nut 12 receives the threaded spindle region 8b, such that, upon rotation of the spindle 8, both spindle nuts 11, 12 move forward or backward. While the spindle nuts 11, 12 will move in the same direction upon rotation of the spindle 8, they will move different distances depending upon the relative pitch of the threads of regions 8a and 8b. Because the spindle nuts 11, 12 move different distances, the two guide slots 5a and 5b can have different lengths corresponding to the different thread pitches of the spindle regions 8a and 8b.

In the embodiment of FIGS. 1–4, the pivot 13a is coupled directly to the seat portion 6, preferably to part of the seat portion frame. In the second embodiment shown in FIGS. 5 through 12, the pivot 13a is coupled to the seat portion 6 through a height adjustment device 4 including an articulation lever 13.

The spindle 8, which works together with the spindle nuts 11 and 12, is electrically driven. Provided for this purpose is an electric motor drive 7, through which the spindle 8 passes. The electric motor drive 7 is arranged on the base 5 beneath the seat portion 6.

Figure 2:
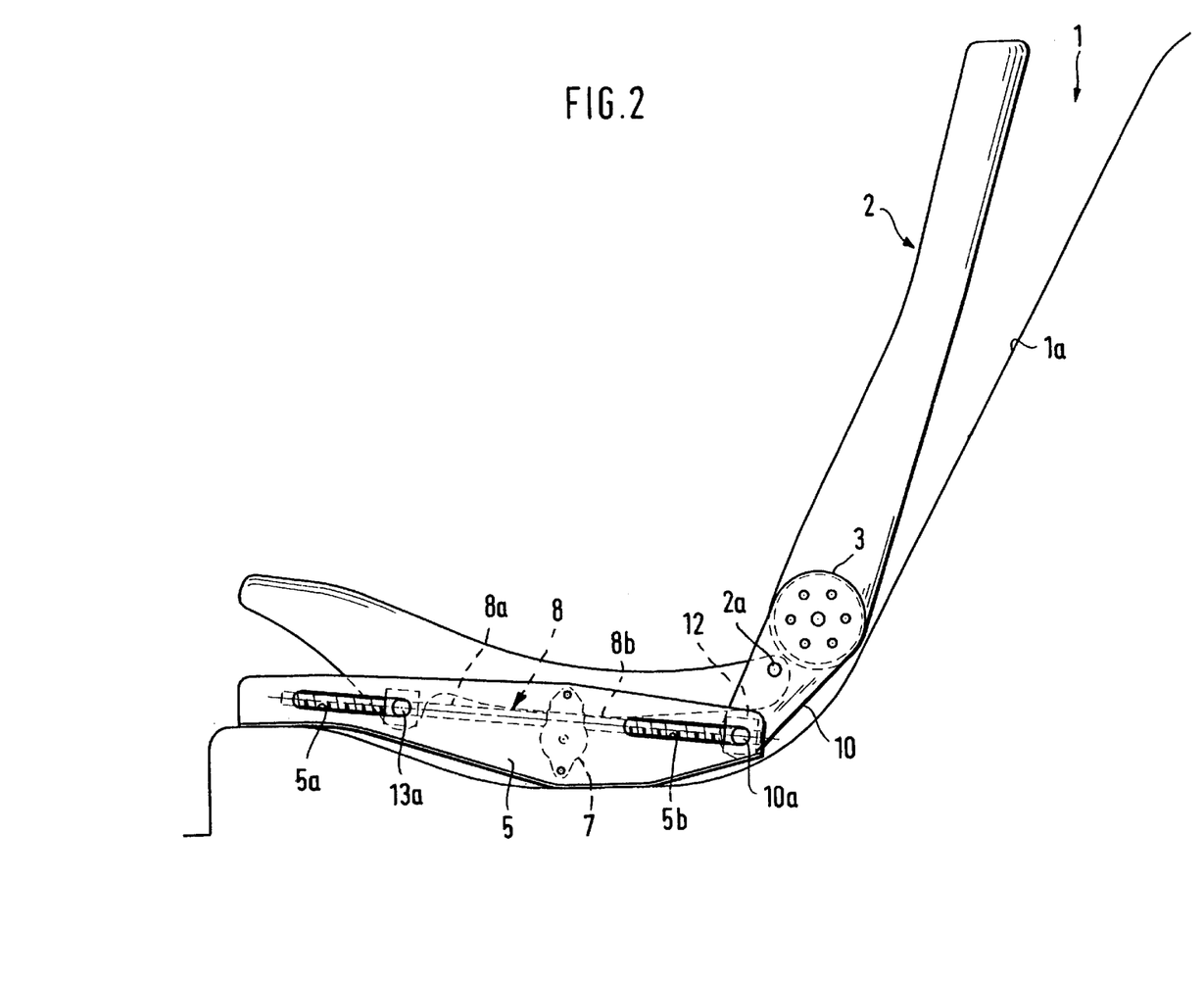
FIG. 2 is a schematic side view of the seat of FIG. 1 in which the seat position is unchanged but the back rest is tilted forward as compared to FIG. 1.

In FIG. 2, the back rest 2 is tilted forward as compared to its position in FIG. 1. The tilt adjustment was accomplished by rotating the knob of the tilt adjustment device 3.

Figure 3:
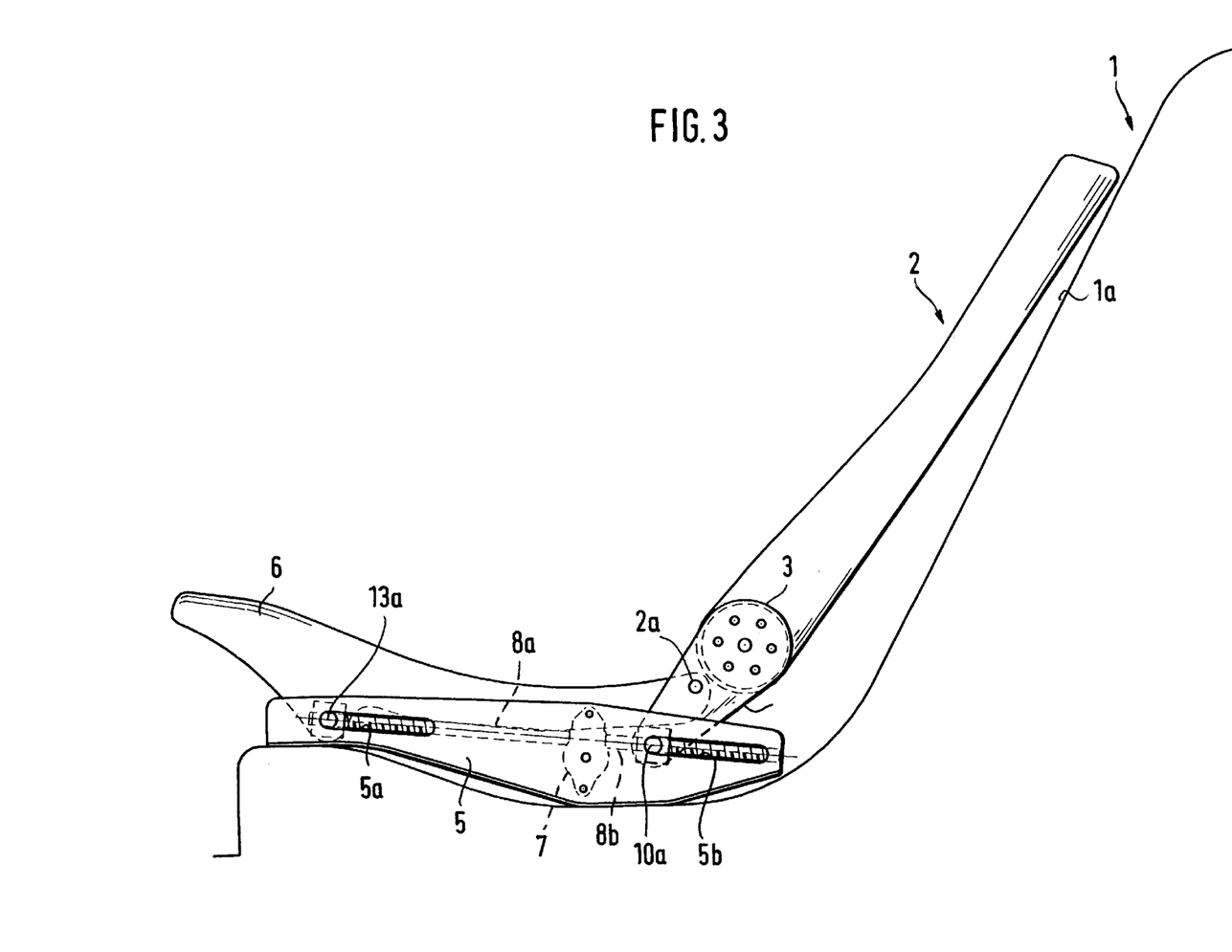
FIG. 3 is a schematic side view of the seat of FIG. 1 in which the seat is in its most forward position and the back rest is tilted rearwardly.

In FIG. 3, the seat has been moved to its forwardmost seat adjustment position. When the seat portion 6 was moved forward, the pivot 10a moved forward a greater distance than the pivot 13a and pivot shaft 2a. As a result, the lever 10 rotates about the pivot shaft 2a in a clockwise direction, causing the back rest to assume a rearward tilt as compared to FIG. 2.

Figure 4:
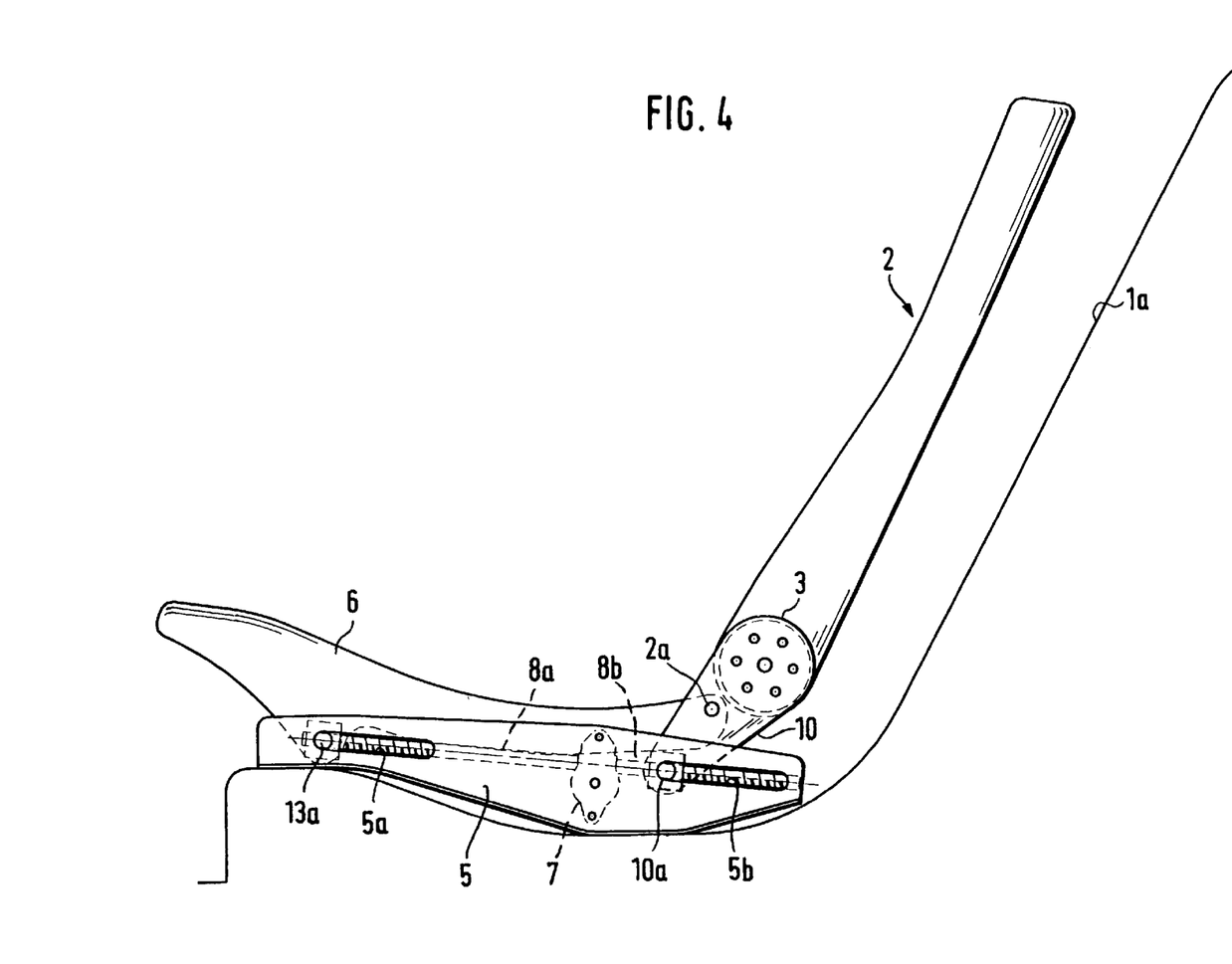
FIG. 4 is a schematic side view of the seat of FIG. 1 in which the seat is in its most forward position and the back rest is tilted slightly rearwardly as compared to FIG. 1.

In the position shown in FIG. 4, the seat 6 has been moved to its most forward position, and the back rest 2 has been re-adjusted to the same tilt angle as in FIG. 1, by rotating the knob of the tilt adjustment device 3.

In addition to the adjustment possibilities described in connection with FIGS. 1–4, the second embodiment also allows for the height adjustment at the front of the seat portion 6. The tilt of the seat portion 6 can be changed with a height adjustment device 4, which is coupled between the seat portion 6 and the pivot 13a by two articulated levers 9 and 13. The height adjustment device 4 may be similar to the tilt adjustment device 3, e.g., have two hinge parts, connected by a planetary gear train, and a rotatable knob to change the tilt angle. The levers 9 and 13 can be part of the hinge parts or separate pieces connected to the hinge parts. When the seat portion 6 is raised at its front, the seat portion 6 is pivoted about its horizontal pivot shaft 2a to change its tilt angle. All remaining adjustment possibilities remain unaffected by the seat tilt adjustment.

As shown in FIGS. 5–12, articulated between the pivot 13a and the horizontal pivot axis 2a of the back rest 2 is a strut 14.

Figure 5:
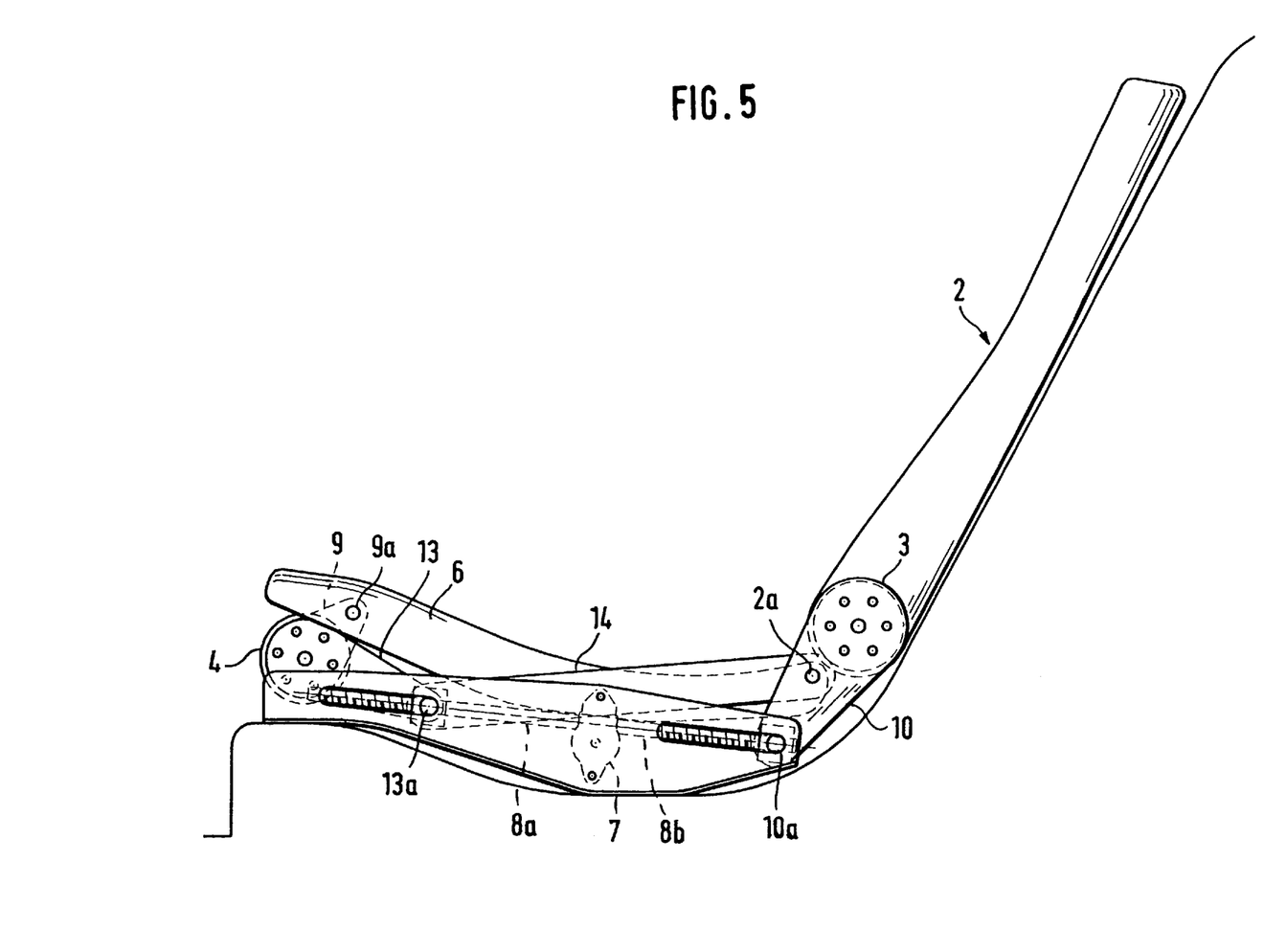
FIG. 5 is a schematic side view of a second embodiment of an automobile seat which includes a height adjustment device to adjust the tilt angle of the seat portion, where the tilt angle of the back rest, the longitudinal position of the seat, and the tilt angle of the seat portion correspond to FIG. 1.
Figure 6:
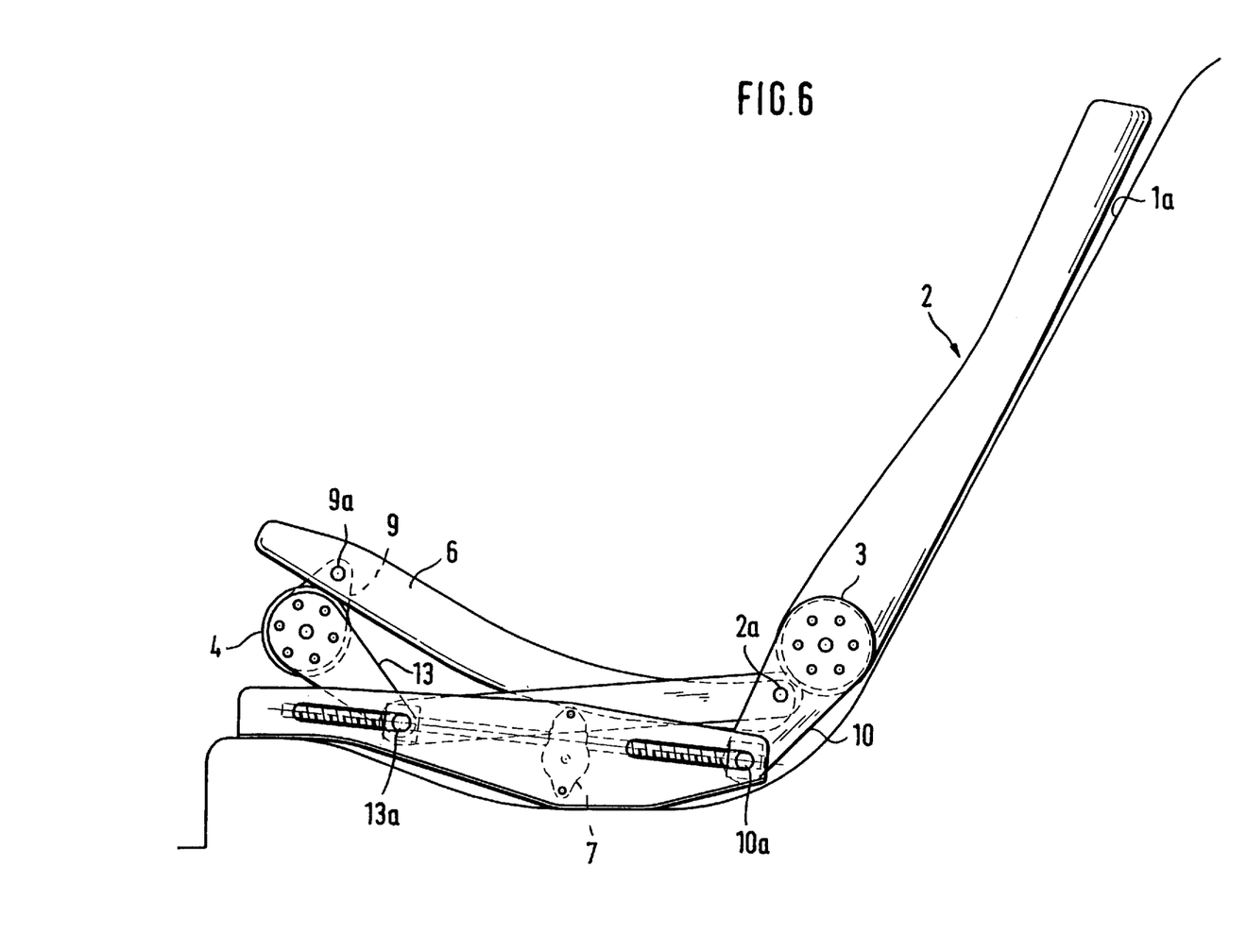
FIG. 6 is a schematic side view of the seat of FIG. 5 in which the seat portion has been tilted upwardly as compared to FIG. 5.
Figure 7:
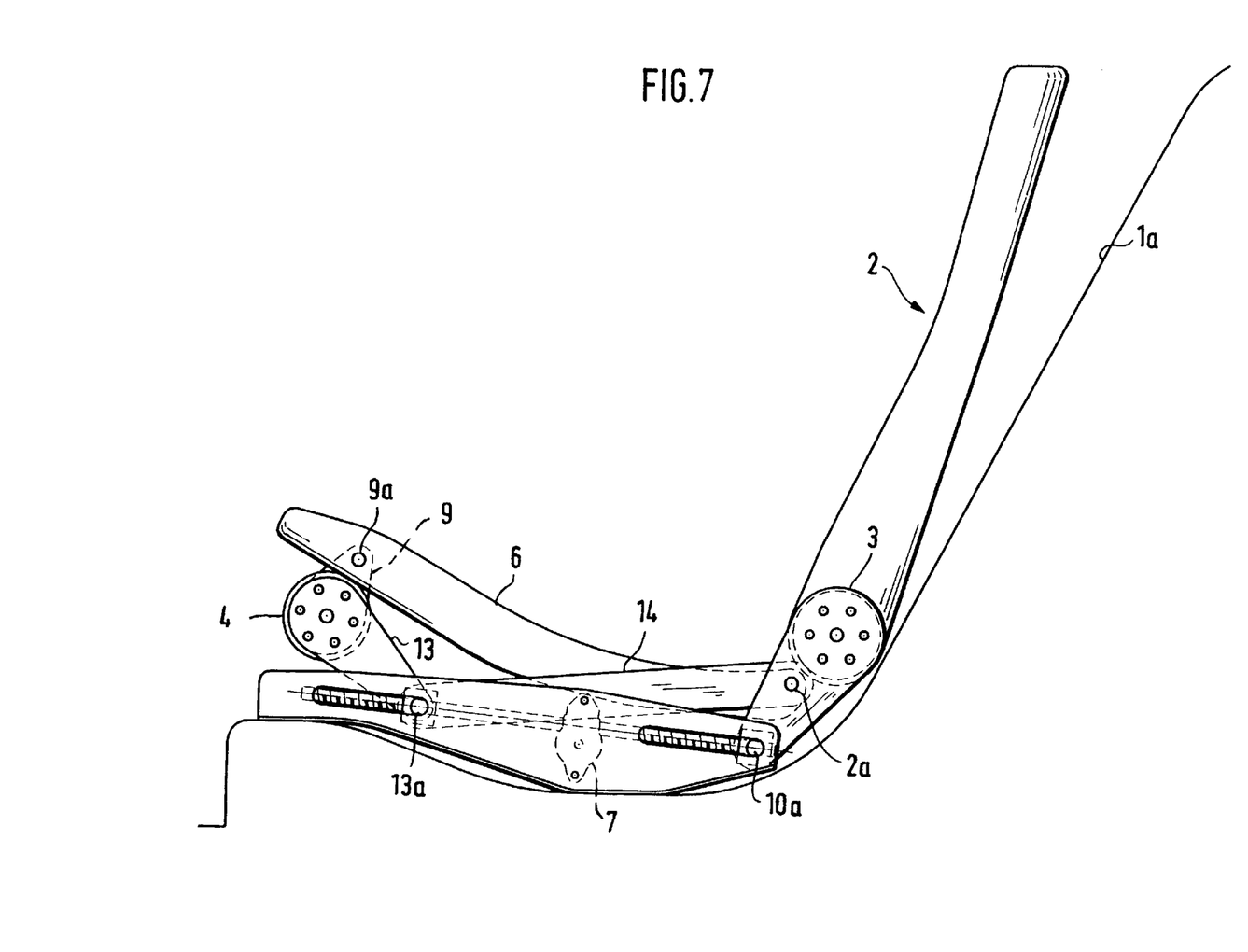
FIG. 7 is a schematic side view of the seat of FIG. 5 in which the seat portion has been tilted upwardly and the back rest has been tilted forward as compared to FIG. 5.
Figure 8:
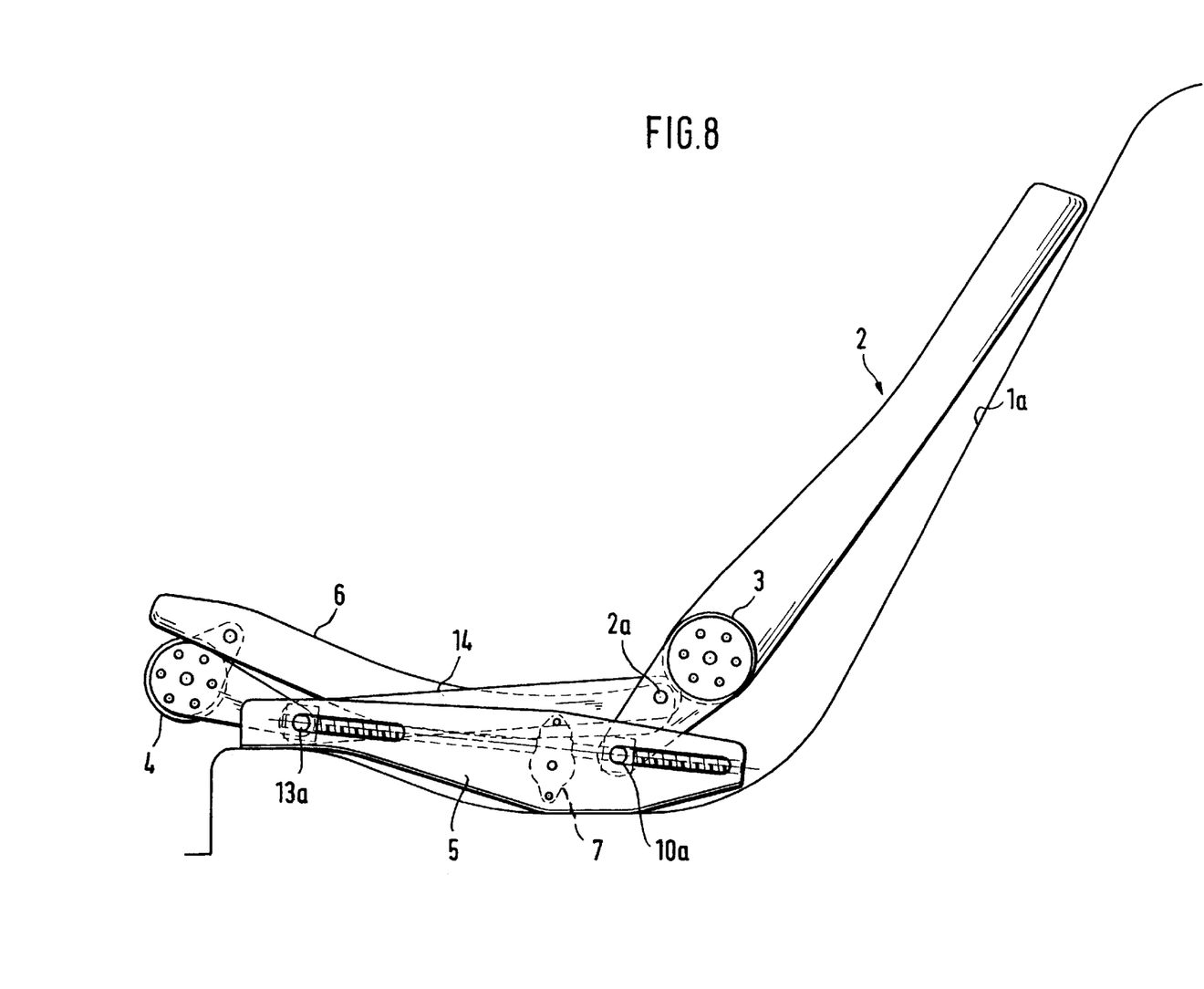
FIG. 8 is a schematic side view of the seat of FIG. 5 in which the seat is in its forwardmost position, in which the back rest has been tilted rearwardly as compared to FIG. 5.
Figure 9:
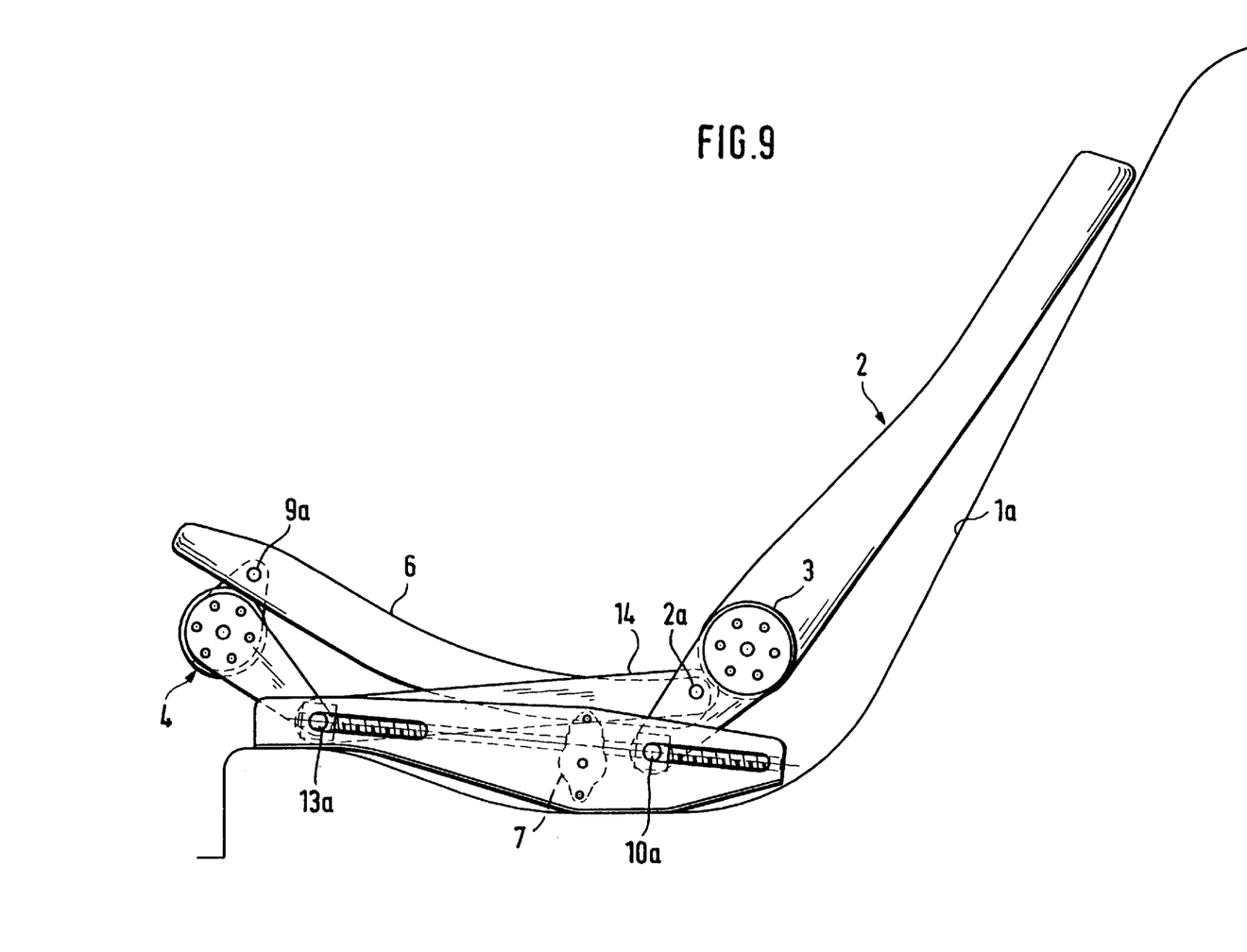
FIG. 9 is a schematic side view of the seat of FIG. 5 in which the seat is in its forwardmost position, in which the seat portion has been tilted upwardly, and in which the back rest has been tilted rearwardly, as compared to FIG. 5.
Figure 10:
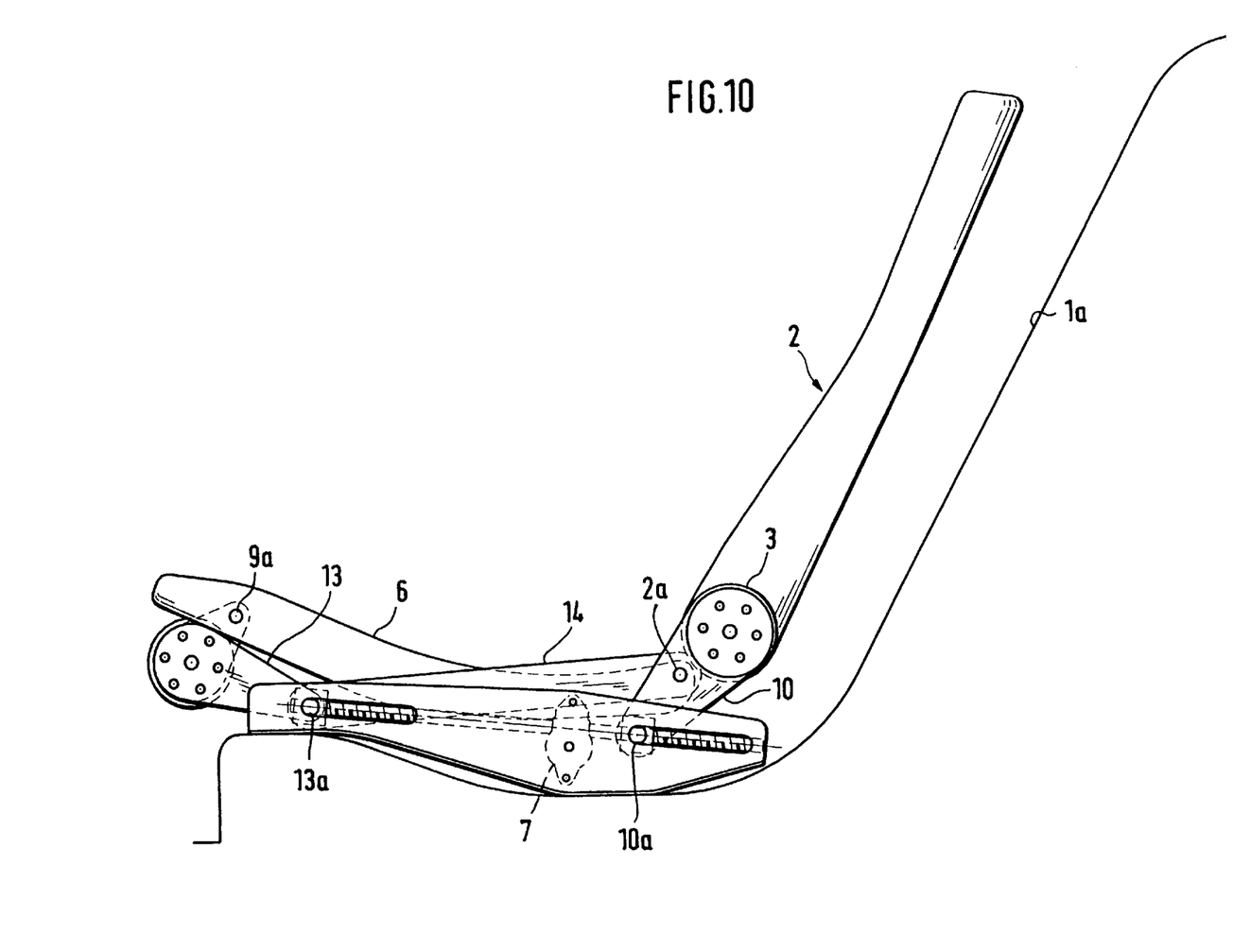
FIG. 10 is a schematic side view of the seat of FIG. 5 in which the seat is in its forwardmost position, in which the seat portion and back rest has the same tilt adjustment as in FIG. 5.
Figure 11:
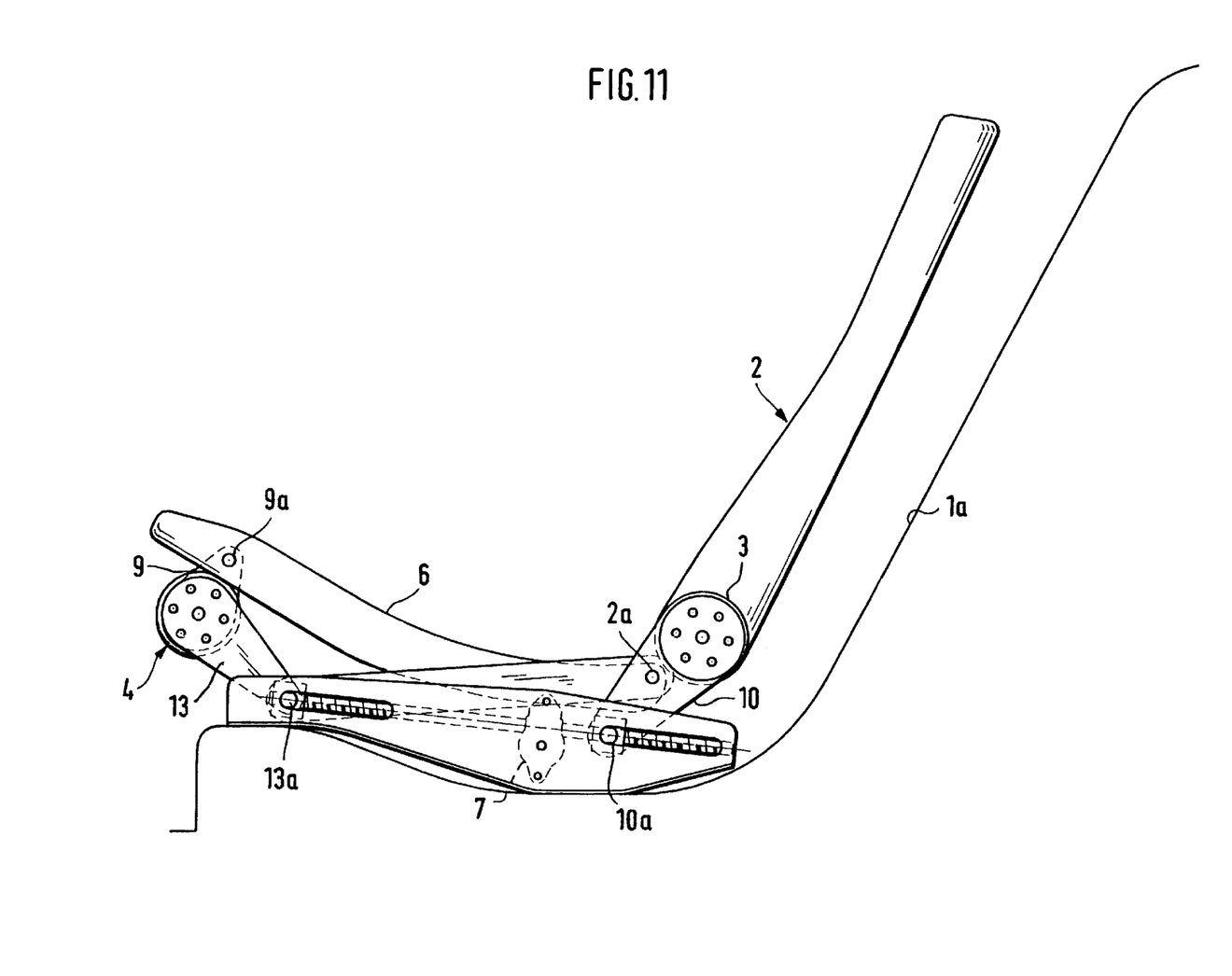
FIG. 11 is a schematic side view of the seat of FIG. 5 in which the seat is in its forwardmost position, in which the back rest has the same tilt adjustment as in FIG. 5, but in which the seat portion is raised in the front.
Figure 12:
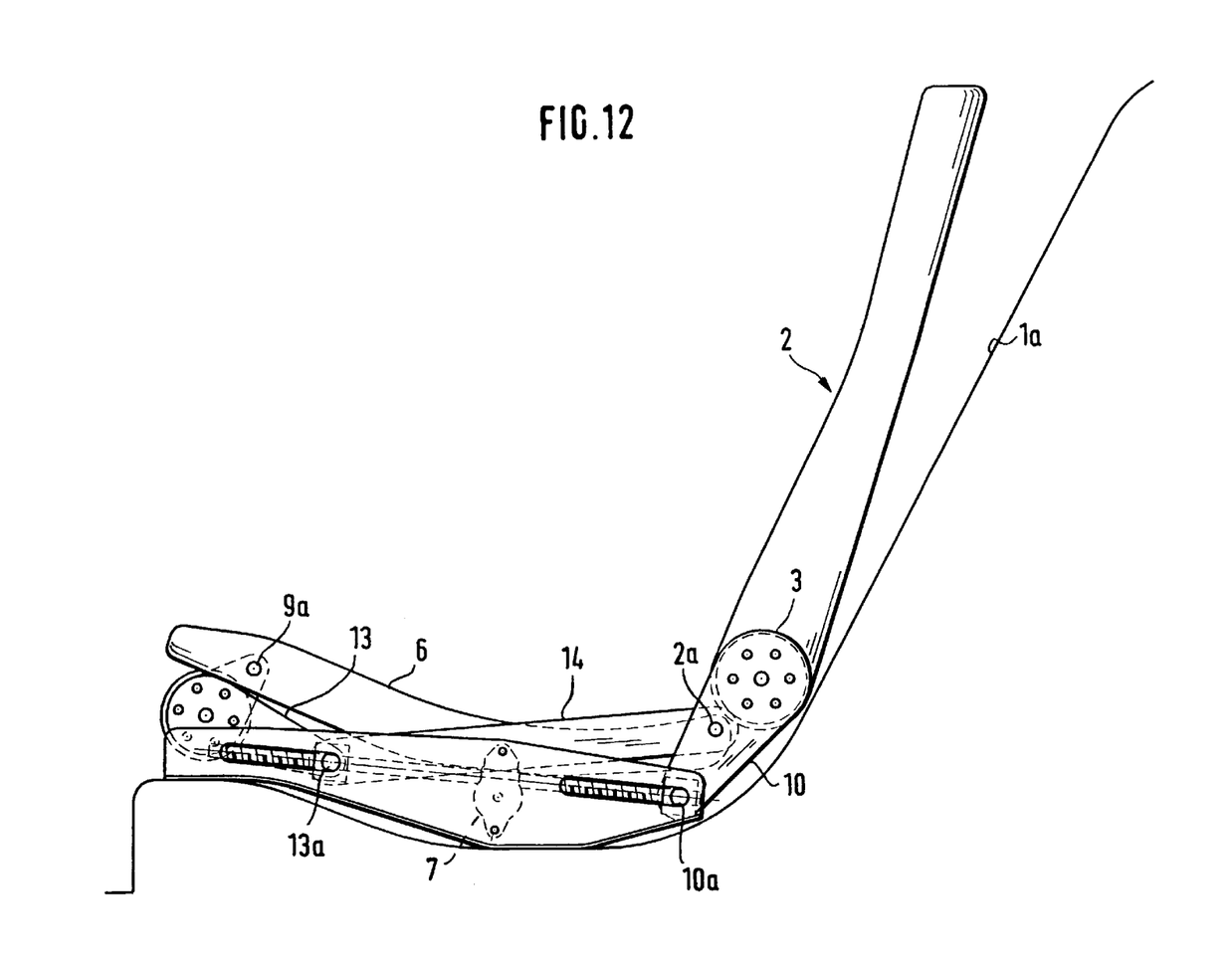
FIG. 12 is a schematic side view of the seat of FIG. 5 in which the seat is in its forwardmost position, in which the seat portion has the same tilt adjustment as in FIG. 5, but in which the back rest has been tilted forward as compared to FIG. 5.

The operation of the seat will now be described in greater detail. In order to move the seat portion 6 forward from its rearmost position, as shown in FIGS. 2 and 5, for example, to its most forward position, as shown, for example, in FIGS. 4 and 10, the electric motor drive 7 moves the spindle nuts 11 and 12 toward their forward positions in the guide slots 5a and 5b by turning the spindle 8. Since the spindle region 8b has a larger pitch than the spindle region 8a, the articulated lever 10 executes a pivot movement around the articulation pivot point 10a (i.e., because the pivot point 10a moves forward a greater distance than the seat portion pivot shaft 2a, the lever 10 rotates clockwise about the shaft 2a). Thus, as the seat portion 6 moves forward, the back rest 2 reclines further back without there being any need to operate the tilt adjustment mechanism.

However, the tilt adjustment of the back rest 2 can also be changed independently of the tilt change that results from the longitudinal movement. This can be done by operating the tilt adjustment mechanism 3.

Both the tilt adjustment mechanism 3 for the adjustment of the tilt angle of the back rest 2 and the height adjustment mechanism 4 for the adjustment of the tilt angle of the seat portion 6 can be any suitable known mechanism such as those previously used in automobile seats.

The invention has particular application to automobile rear seats. In the position shown in FIG. 1, in the case of a back seat, the back rest 2 cannot normally be tilted back without encountering the rear panel 1a. In the case of the present invention, however, the rear passenger can nevertheless recline the back rest 2, by actuating the motor drive 7 which, s described above, will cause the back rest 2 to recline automatically as the seat moves forward. Thus, the passenger can continue to move the seat 6 forward until the back rest 2 has reached a comfortable tilt angle. If the seat has been moved to its forwardmost position, and the rear passenger wishes to recline the back rest 2 still further, such can be accomplished (to the extent that sufficient room remains between the back rest 2 and the rear panel 1a) by operating the tilt adjustment mechanism.

The foregoing represents preferred embodiments of the invention. Variations and modifications will be apparent to persons skilled in the art, without departing from the inventive concepts disclosed herein. For example, while preferred embodiments have been described with reference to a back seat of an automobile, the invention may be employed in the front seats as well, or in other types of motor vehicles. All such modifications and variations are intended to be within the skill of the art, as defined in the following claims.

I claim:

1. A motor vehicle seat having longitudinal and transverse horizontal axes and comprising
   a base;
   a seat portion having a forward end coupled to said base for pivoting about a first axis parallel to said transverse axis, wherein the location of said first axis is adjustable along said longitudinal axis;
   a back rest;
   a tilt adjustment device having a first hinge portion secured relative to said back rest and a second hinge portion whose angular position about a second axis parallel to said transverse axis is adjustable relative to said first hinge portion;
   an articulation lever secured to said second hinge portion and pivotably secured, about a third axis parallel to said transverse axis and spaced from said second axis, to said seat portion; wherein said articulation lever is pivotably coupled to said base about a fourth axis which is parallel to said transverse axis, and wherein said fourth axis is adjustable along said longitudinal axis, whereby the tilt position of said back rest may be adjusted by changing the angle of said articulation lever relative to said second axis and may be further adjusted independent of said articulation lever by actuating said tilt adjustment device.

2. A motor vehicle seat according to claim 1, further comprising a strut pivotably connected to said base about said first axis and to said seat portion about said third axis.

3. A motor vehicle seat according to claim further comprising a first guide element for coupling said seat portion to said base about said first axis and a second guide element for coupling said articulation lever to said base about said fourth axis, wherein said guide elements are mounted in guide portions in said base for movement in a longitudinal direction.

4. A motor vehicle seat according to claim 3, wherein said first and second guide elements include spindle nuts, and further comprising a spindle passing through said spindle nuts and being rotatable for causing said spindle nuts to move parallel to said longitudinal axis.

5. A motor vehicle seat according to claim 4, further comprising a drive unit for selectively rotating said spindle, wherein said drive unit includes means for being secured to a car body and is positioned between said spindle nuts.

6. A motor vehicle seat according to claim 4, wherein rotation of said spindle causes said first and second spindle nuts to travel different distances.

7. A motor vehicle seat according to claim 6, wherein said spindle has different thread pitches associated with each spindle nut, and wherein said spindle nuts have corresponding thread pitches.

8. A motor vehicle seat according to claim 1, further comprising a height adjustment device for pivotably coupling the forward end of said seat portion to said base about said first axis.

9. A motor vehicle seat according to claim 8, wherein said height adjustment device includes a rotatable adjustment knob.

10. A motor vehicle seat according to claim 1, wherein said tilt adjustment device includes a rotatable adjustment knob.

11. A motor vehicle having a rear panel and at least one rear seat with longitudinal and transverse horizontal axes and comprising:
    a base;
    a seat portion having a forward end coupled to said base for pivoting about a first axis parallel to said transverse axis, wherein the location of said first axis is adjustable along said longitudinal axis between a forwardmost and rearmost position;
    a back rest;
    a tilt adjustment device having a first hinge portion secured relative to said back rest and a second hinge portion whose angular position about a second axis parallel to said transverse axis is adjustable relative to said first hinge portion;
    an articulation lever secured to said second hinge portion and pivotably secured, about a third axis parallel to said transverse axis and spaced from said second axis, to said seat portion; wherein said articulation lever is pivotably coupled to said base about a fourth axis which is parallel to said transverse axis, and wherein said fourth axis is adjustable along said longitudinal axis, whereby the tilt position of said back rest may be adjusted by changing the angle of said articulation lever relative to said second axis and may be further adjusted independent of said articulation lever by actuating said tilt adjustment device, wherein in said first position said rear panel limits the tilt angle of said back rest, and wherein moving said seat portion forward causes such tilt angle automatically to increase.

* * * * *